US012615164B2

(12) United States Patent
Mee

(10) Patent No.: US 12,615,164 B2
(45) Date of Patent: Apr. 28, 2026

(54) BLOCKCHAIN BASED TRANSACTION PROTOCOL

(71) Applicant: nChain Licensing AG, Zug (CH)

(72) Inventor: Andrew James Mee, London (GB)

(73) Assignee: nChain Licensing AG, Zug (CH)

( * ) Notice: Subject to any disclaimer, the term of this patent is extended or adjusted under 35 U.S.C. 154(b) by 70 days.

(21) Appl. No.: 18/686,656

(22) PCT Filed: Sep. 21, 2022

(86) PCT No.: PCT/EP2022/076270
§ 371 (c)(1),
(2) Date: Feb. 26, 2024

(87) PCT Pub. No.: WO2023/046779
PCT Pub. Date: Mar. 30, 2023

(65) Prior Publication Data
US 2024/0380621 A1 Nov. 14, 2024

(30) Foreign Application Priority Data

Sep. 22, 2021 (GB) ...................................... 2113527

(51) Int. Cl.
*G06Q 20/00* (2012.01)
*H04L 9/00* (2022.01)
(Continued)

(52) U.S. Cl.
CPC .............. *H04L 9/50* (2022.05); *H04L 9/3239* (2013.01); *H04L 63/0428* (2013.01); *H04L 63/12* (2013.01); *H04L 67/04* (2013.01)

(58) Field of Classification Search
CPC ..... H04L 9/50; H04L 9/3239; H04L 63/0428; H04L 63/12; H04L 67/04
(Continued)

(56) References Cited

U.S. PATENT DOCUMENTS

2009/0089209 A1* 4/2009 Bixler .................. G06Q 20/102
705/40

FOREIGN PATENT DOCUMENTS

WO 2020165679 A1 8/2020
WO 2020212766 A1 10/2020
(Continued)

OTHER PUBLICATIONS

Alin Tomescu et al: "Catena: Preventing Lies with Bitcoin", IACR, International Association for Cryptologic Research, vol. 20161115:150307, Nov. 13, 2016 (Nov. 13, 2016), pp. 1-17.
(Continued)

*Primary Examiner* — Dante Ravetti
(74) *Attorney, Agent, or Firm* — Galvani Smith PLLC

(57) ABSTRACT

The present disclosure proposes methods, devices and systems for processing a transaction between a customer and a merchant. The method may be performed at a merchant device. The method may comprise receiving customer information from a customer device associated with the customer; establishing a secure communication channel between the customer and the merchant based on the customer information; generating a partial invoice transaction based on the customer information; sending the partial invoice transaction to the customer device via the secure communication channel; receiving via the secure communication channel, a transaction which is a completed version of the partial invoice transaction and which has been authorised at the customer device; validating the transaction; broadcasting the validated transaction to a blockchain node to be submitted to a blockchain; receiving at least one notification that the transaction has been validated by the blockchain node and included on the blockchain.

24 Claims, 6 Drawing Sheets

(51) Int. Cl.
*H04L 9/32*          (2006.01)
*H04L 9/40*          (2022.01)
*H04L 67/04*         (2022.01)
(58) Field of Classification Search
USPC .......................... 705/16, 21, 59; 380/44, 262
See application file for complete search history.

(56)                    References Cited

FOREIGN PATENT DOCUMENTS

| WO | 2020234824 A1 | 11/2020 |
| WO | 2021064565 A1 | 4/2021 |
| WO | 2021165848 A1 | 8/2021 |

OTHER PUBLICATIONS

PCT/EP2022/076270 International Search Report and Written Opinion dated Dec. 13, 2022, 12 pages.

* cited by examiner

Customer

Merchant

Figure 2

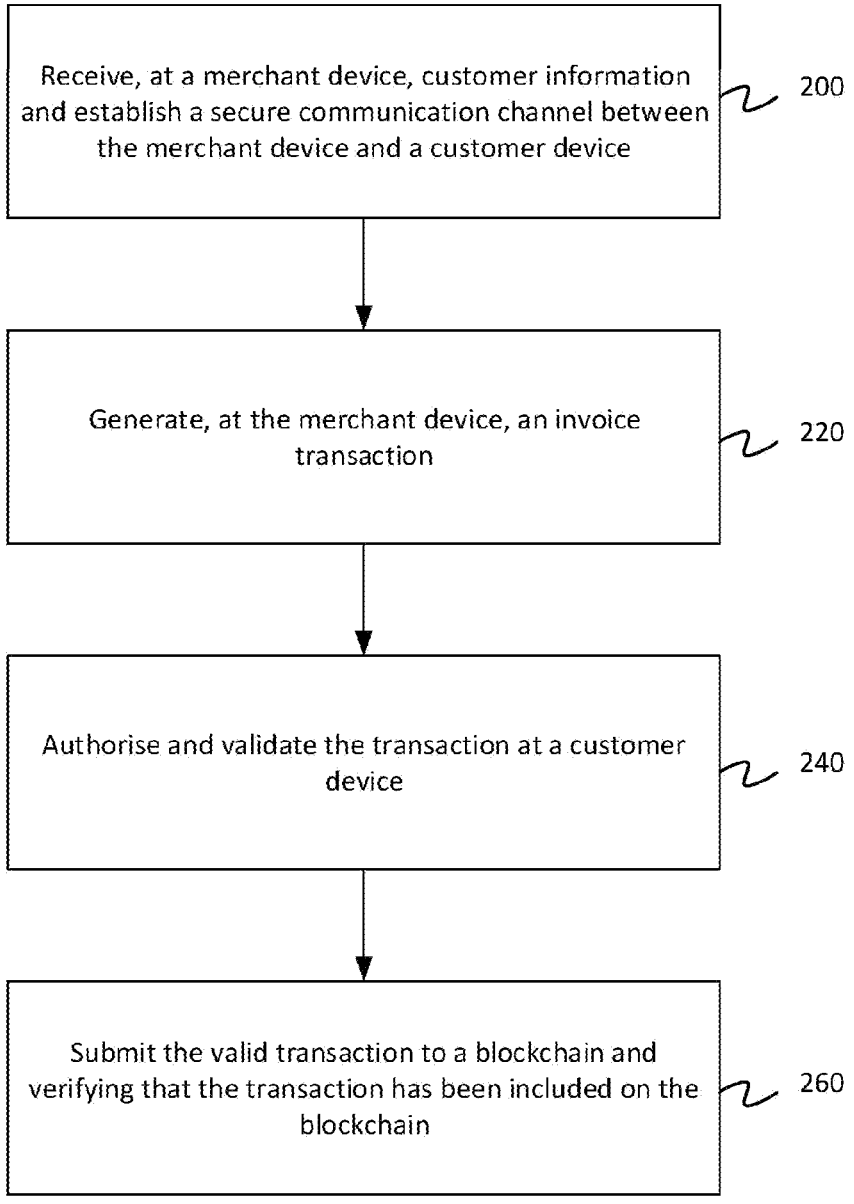

Receive, at a merchant device, customer information and establish a secure communication channel between the merchant device and a customer device ~ 200

Generate, at the merchant device, an invoice transaction ~ 220

Authorise and validate the transaction at a customer device ~ 240

Submit the valid transaction to a blockchain and verifying that the transaction has been included on the blockchain ~ 260

BLOCKCHAIN BASED TRANSACTION PROTOCOL

CROSS REFERENCE TO RELATED APPLICATIONS

This application is the U.S. National Stage of International Application No. PCT/EP2022/076270 filed on Sep. 21, 2022, which claims the benefit of United Kingdom Patent Application No. 2113527.2, filed on Sep. 22, 2021, the contents of which are incorporated herein by reference in their entireties.

FIELD

This disclosure relates generally to methods and systems for implementing a payment service for one or more clients. Particularly, but not limited to, the present disclosure relates to enabling secure and reliable payment transactions associated with a blockchain or distributed ledger for, or on behalf of, one or more clients, the transactions pertaining to a digital asset payment associated with a customer. The disclosure is particularly suited, but not limited to providing methods for facilitating cryptocurrency payments from a customer to a merchant.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset such as cryptocurrency, tokens representing at least a part of a property, a smart contract, a license, i.e. software license, or DRM contracts for media content etc. It will be understood that the term digital asset is used throughout this document to represent a commodity that may be associated with value that may be transferred to or provided as a payment in a transaction from one entity to another.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated resource to another address associated with an input in another transaction. This transfer is usually, but not essentially, done using a digital wallet. This digital wallet may be a device, physical medium, program, application (app) on a computing device such as a desktop, laptop or a mobile terminal, or a remotely hosted service associated with a domain on a network, such as the Internet. The digital wallet stores public and private keys and can be used to track ownership of resources, tokens and assets etc. associated with a user, receive or spend digital assets, transfer tokens which may relate to digital assets such as cryptocurrencies, or licenses, or property, or other types of resource. The cryptocurrency itself is not stored in the digital wallet, in the case of bitcoin and cryptocurrencies derived from it, the cryptocurrency is de-centrally stored and maintained in the publicly available ledger, i.e. the blockchain. There are various forms of known cryptocurrency wallets, and a network of such wallets is referred to as an ecosystem, such as the ecosystem of Bitcoin SV (BSV) wallets. The digital wallet may also be a Simplified Payment Verification (SPV) wallet.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

The above-mentioned examples or scenarios relate to a transfer of some asset, i.e. a digital asset, or control of a digital asset between users or entities. Accordingly, there is a desire to implement a secure and robust system that is akin to existing payment or e-commerce systems for exchange of funds between two entities—especially for digital asset payments between a merchant and a customer that may respect an asset in real world, with a better user experience, cheaper merchant or payee costs, and a safer level of security. More particularly there is a desire to make use of distributed ledger (blockchain) technology and the advantages of increased security, transparency and reliability of records to provide a common platform or interface that enables any merchant, or a plurality of merchants, to ensure that digital asset payments with their respective customers can be instantaneously and securely mined or written into the blockchain, thereby providing a lasting, tamper-proof and auditable record of such payments.

Simplified payment verification (SPV) mechanisms exist, where applications require information from the blockchain but do not have direct links to it, as they do not run a full miner node. Such SPV applications allows a lightweight client to verify that a transaction is indeed included in a blockchain, without downloading the entire blockchain. Although this is advantageous, this still presents a requirement for a client to run parts of the blockchain that are associated with transactions pertaining to it, as either the sender or the recipient among the peers is required to ultimately submit the transaction to the blockchain, and identify if said transaction has been mined.

SUMMARY

Aspects of the method are set out in the independent claims and preferred features are set out in the dependent claims.

In a first aspect, the present disclosure proposes a method for processing a transaction between a customer and a merchant. The method may be performed at a merchant device. The method may comprise receiving customer information from a customer device associated with the customer; establishing a secure communication channel between the customer and the merchant based on the customer information; generating a partial invoice transaction based on the customer information; sending the partial invoice transaction to the customer device via the secure communication channel; receiving via the secure communication channel, a transaction which is a completed version of the partial invoice transaction and which has been authorised at the customer device; validating the transaction; broadcasting the validated transaction to a blockchain node to be submitted to a blockchain; receiving at least one notification that the transaction has been validated by the blockchain node and included on the blockchain.

According to a second aspect there is provided a computer system for processing a transaction between a customer and a merchant. The system may comprise: a merchant device configured to perform the method of the first aspect; a customer device; and a blockchain node which is one of a plurality of blockchain nodes that make up a blockchain network.

According to a third aspect there is provided a computing device comprising a processor and memory, the memory including executable instructions that, as a result of execution by the processor, causes the device to perform the computer-implemented method as set out in the first aspect.

According to a fourth aspect, there is provided a computer-readable storage medium having stored thereon executable instructions that, as a result of being executed by a processor of a computer, cause the computer to perform the method of the first aspect.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which:

FIG. 2 illustrates a block diagram of a method for processing a transaction between a merchant and a customer.

DETAILED DESCRIPTION

Figure 1:
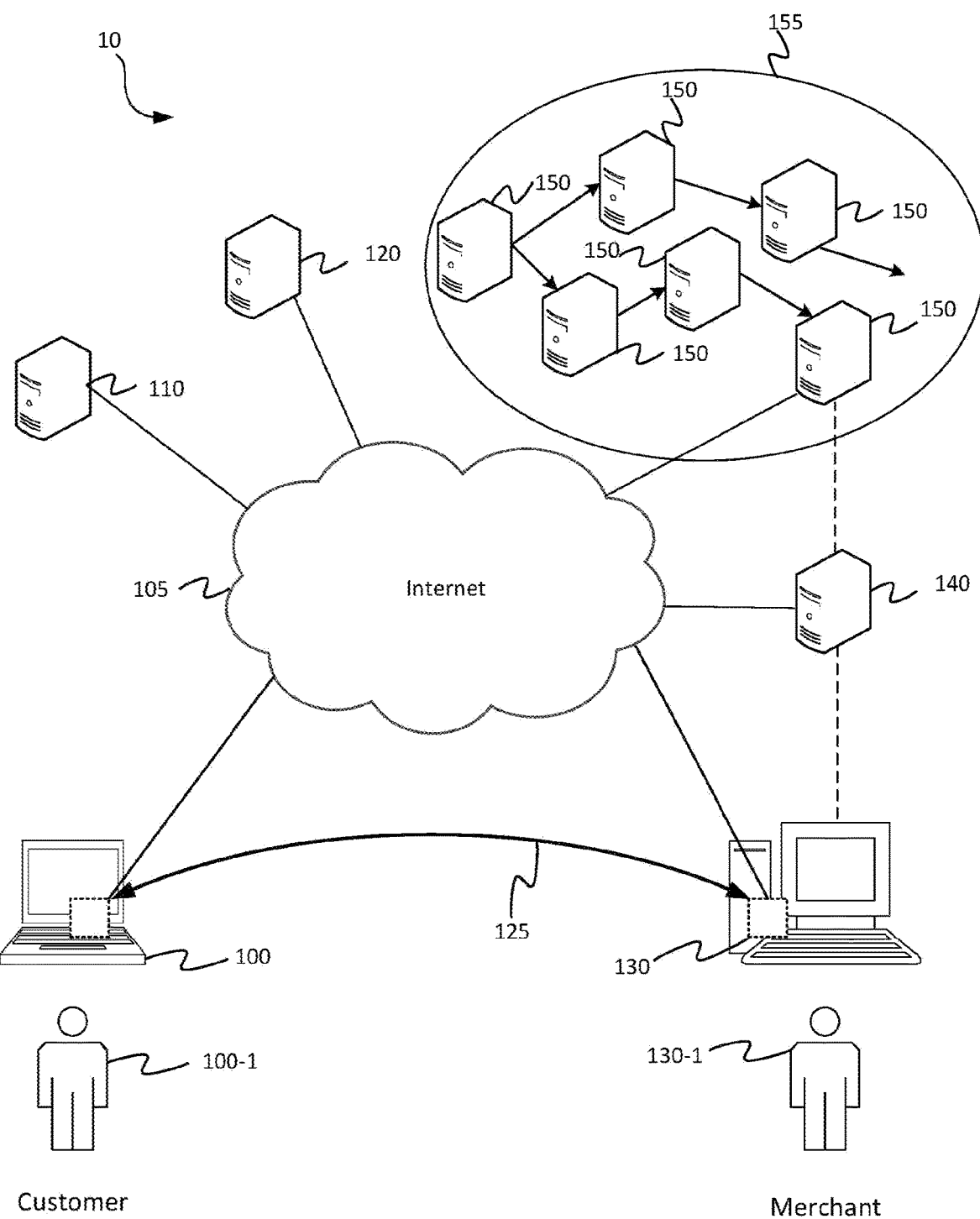
FIG. 1 illustrates an example system for implementing a transaction between a customer and a merchant.

A computer implemented method of implementing an asset transfer service for one or more clients for transactions associated with a distributed ledger is provided. In one example the asset transfer service may be a payment service. The method implements a payment service for enabling transactions associated with a customer and a merchant to be written into, or stored in a distributed ledger, i.e. a blockchain. The payment service can be implemented as an API to which the merchant has access to, and which processes digital asset payments pertaining to the merchant.

The methods described herein provide a payment service which combines a number of advantageous processes both off-chain and on-chain to ensure that transactions are completed efficiently whilst maintaining security of both the transaction itself and the parties involved. The architecture underpinning the transaction can be scaled up to overcome certain limitations seen with traditional blockchain systems. There is implemented herein a secure, low-complexity, user-friendly, efficient, and robust process that will allow any client, whether computationally sophisticated or not, to be able to instantaneously access and interact with another party, i.e. a counterparty or a sender/recipient of a transaction associated with said client, directly (in a peer-to peer manner) in a simple, orderly, fast, accurate, reliable, and secure manner, that is computationally and functionally less onerous for the client. Blockchain technology, and the advantages of increased security, transparency, and reliability of records is provided in a manner that enables any client computing device to ensure that any data, event, or digital asset associated with the client, can be instantaneously and securely mined to the blockchain, or written into the blockchain easily thereby providing a lasting, tamper-proof, and auditable record of it, which can be created, written, updated, read, or viewed as required. Preferably this can be performed by clients such as a merchant and a customer who are light clients, so do not require downloading or running any part of the blockchain themselves. Simplified and accessible interaction with a node which does download and run part or all of the blockchain is also provided by the methods described herein, which ensures that the transaction can be written to the blockchain.

The present disclosure proposes methods, devices and systems for processing a transaction between a customer and a merchant. The method may be performed at a merchant device. The method may comprise receiving customer information from a customer device associated with the customer; establishing a secure communication channel between the customer and the merchant based on the customer information; generating a partial invoice transaction based on the customer information; sending the partial invoice transaction to the customer device via the secure communication channel; receiving via the secure communication channel, a transaction which is a completed version of the partial invoice transaction and which has been authorised at the customer device; validating the transaction; broadcasting the validated transaction to a blockchain node to be submitted to a blockchain; receiving at least one notification that the transaction has been validated by the blockchain node and included on the blockchain. In some embodiments, the merchant and customer devices may be lightweight clients (light clients).

The above method provides safe, instant transactions between a merchant, a customer and the blockchain, which are scalable, stable and secure. Advantageously, the method provides a secure and efficient way to perform a transaction between a customer and a merchant that can be achieved substantially at lightweight clients of the blockchain network. Lightweight or light clients do not need to run as a full node of the blockchain, i.e. they do not possess a full replica of the blockchain. As such are much lighter on energy consumption and storage requirements so are cheaper to run and require much lower bandwidths compared to a "full" or "miner" node. The benefit of generating and validating the transaction at the merchant and customer devices which are not full nodes is that the time taken and processing power required is significantly reduced. In particular, the computing requirements of the customer and merchant devices may be far less than those of the blockchain node. This ultimately results in a method which is scalable, which is a limitation of the current infrastructure.

The method provides secure communications between the two entities via the secure communication channel. These communications are not posted to the blockchain, (i.e. "off-chain") which may be a public ledger, and so beneficially remain private. The secure communication channel therefore enables an exchange of resources with increased security and confidentiality.

Furthermore, providing the customer with a partial invoice transaction (also performed "off-chain") allows the customer to fill out and complete the transaction themselves. This in turn allows for immediate reconciliation. Validating the transaction prior to being uploaded on the blockchain can result in fast processing of the transaction, the merchant can interact directly with the blockchain node, which may be a miner node for example, and may receive instant notification that the transaction has been written to the blockchain.

In some embodiments, the partial invoice transaction may be a transaction template.

In some embodiments, the customer information optionally comprises a purchase order and an alias of the customer. This information can be used to generate the partial invoice transaction. The alias of the customer may allow the merchant device to find and or verify the customer, for example over the internet or via a secure method.

In some embodiments, the alias of the customer may be verified in connection with a server which is external to the merchant device. The server may store a plurality of aliases relating to one or more customers or merchants and may facilitate communications between the two entities.

In some embodiments, receiving the customer information may establish a handshake procedure between the client and the merchant. The handshake procedure may ensure that a secure communication process is established before any data is shared. It may further allow the merchant and customer to each verify the other device.

In some embodiments, the secure communication channel can be established in connection with a channel server which is external to the merchant device. Advantageously, this can help maintain security to both parties. It may also help to reduce processes performed at the merchant device, thereby saving energy consumption and/or storage space required at the merchant device which helps to improve efficiency of the method and improved performance at the merchant device.

In some embodiments, the secure communication channel may permit communications to be sent from both the merchant to the customer and from the customer to the merchant. In this manner, only one channel can be enabled between the client devices. This can advantageously maintain a transaction history. Furthermore, a two-way communication channel may reduce chances of failure or security breach for example compared to two one-way communication channels.

In some embodiments, the secure communication channel may be end-to-end encrypted. This advantageously provides further security and protection against hacking or attacks.

In some embodiments, generating the partial invoice transaction may comprise populating a transaction template with one or more transaction outputs in connection with a merchant wallet. The transaction template may comprise transaction outputs, which may specify a certain value of a cryptocurrency to be paid to the merchant. Transaction outputs may further comprise a digital signature of the merchant, required in transaction validation. In some embodiments, transaction outputs further comprise a locking script. Advantageously, providing a transaction template populated with transaction outputs in connection with a merchant wallet may help to improve confidence between the merchant and customer.

In some embodiments, the transaction may comprise one or more transaction inputs associated with a customer wallet, wherein the one or more transaction inputs comprises at least a Merkle root of a previous transaction. The transaction inputs may comprise a digital signature of the customer. Transaction inputs may further comprise an unlocking script. Advantageously, the partial invoice transaction may be completed by the customer at the customer device, where the customer inserts inputs in connection with a customer wallet. The Merkle root of the previous transaction may be readily available to the customer at the customer device, thereby improving efficiency of the transaction process.

Optionally, the transaction is encapsulated in a data structure that further comprises Merkle Proofs and full transactions of confirmed ancestors. For example, the transaction may further comprise an SPV envelope. The SPV Envelope is a data structure that encapsulates a transaction along with Merkle Proofs and full transactions of confirmed ancestors. The SPV envelope, along with encapsulated Merkle proof(s) provide information that help to prove that a transaction is valid because it enables a higher level of confidence in transactions with unconfirmed ancestors, such as reduced double spend risk, and transactions with interim state, such as state channels by providing information required to validate transactions. In some embodiments, validating the transaction may comprise independently constructing a Merkle root of the previous transaction and cross-checking the constructed Merkle root with the Merkle root of the one or more transaction inputs. Independently constructing a Merkle root is optionally performed at the merchant device. The inclusion of a combination of Merkle Proofs provides information required to assess the likelihood of the transaction being confirmed. Providing such information can also improve the speed with which the transaction is confirmed and validated.

In some embodiments, the Merkle root may be independently constructed by the merchant device in communication with a headers client which provides a best chain of block headers. A headers client may run as a light client and provide the merchant device with the best chain of block headers. The headers client operating as a light client of the blockchain does not possess a full replica of the blockchain or run as a full node. If it is confirmed that a Block Hash is in the best chain, provided to the merchant by the headers client, the transaction can be confirmed as a valid transaction.

In some embodiments, the transaction may be validated if the Merkle root provided in the transaction matches the independently constructed Merkle root. If this check passes, then it may be determined that the transaction is ready to be included in the blockchain and the merchant determines that the transaction is verified.

In some embodiments, the transaction may be a Bitcoin transaction.

In some embodiments, the at least one notification may be a call-back notification. Optionally, the call-back notification provides a return Merkle proof indicative that the transaction has been successfully submitted to the blockchain. A call-back notification may relate to a proof of inclusion of the transaction submitted by the given client in the blockchain, i.e. a Merkle Proof.

Optionally, the return Merkle proof may comprise: a transaction identifier of the blockchain transaction that the Merkle proof relates to; a block header of the block in which the blockchain is included; and an array of sibling hashes for the transaction identifier.

In some embodiments, the method may further comprise sending the at least one notification to the customer device. This may comprise a Merkle Proof. Advantageously, providing this information can indicate to the client that the transaction has been validly added to the blockchain, meaning that the transaction has been finalised and completed.

In some embodiments, the method may further comprise closing the secure communication channel once the at least one notification has been received. This can help to improve security and reduce total storage requirements of the merchant device and/or customer device.

In some embodiments, a public address of the customer and a public address of the merchant may each include a public key of a respective digital wallet associated with the customer and the merchant.

In some embodiments, a digital signature can be used for verifying the identity of the merchant and/or the customer, and wherein the digital signatures associated with both the merchant and the customer are required for verification of each respective entity before the transaction is created, stored or posted on the blockchain ledger.

There is provided herein a computer system for processing a transaction between a customer and a merchant. The system may comprise: a merchant device configured to perform the method of the first aspect; a customer device; and a blockchain node which is one of a plurality of blockchain nodes that make up a blockchain network.

There is provided herein a computing device comprising a processor and memory, the memory including executable instructions that, as a result of execution by the processor, causes the device to perform the computer-implemented method as set out above.

There is provided herein a computer-readable storage medium having stored thereon executable instructions that, as a result of being executed by a processor of a computer, cause the computer to perform the method as set out above.

As described above, the method, device and systems disclosed herein provide a seamless accumulation of secure processes both off-chain and on-chain between a customer device, a merchant device and a blockchain node to ensure the smooth running of a transaction from offer through to completion of the transaction on the blockchain. A number of advantageous processes combine to ensure security of the parties involved and improve efficiency of the time taken for the transaction to be submitted and accepted on the blockchain.

FIG. 1 illustrates an example system 10 for implementing a payment transaction between a customer 100 and a merchant 130.

The system 10 comprises a customer 100-1 associated with customer device 100, an addressing server 110, a Channel Server 120, a merchant 130-1 associated with merchant device 130, a merchantAPI (mAPI) 140, and a blockchain node 150 which is a node, for example a miner node, in a peer-to-peer (P2P) network 155. The addressing server 110 preferably implements an alias based addressing. This is hereinafter referred to as a payment service 110 or payment server 100 or PayMail server 110. Each of the elements of the system 10 are connectable to a communications network such as the internet 105. A side channel (secure channel) 125 may be enabled between the customer 100 and merchant 130.

The system comprises computer equipment of users including the customer 110 and the merchant 130. These users may interact with the blockchain network but do not participate in validating, constructing or propagating transactions and blocks in the network 155. The customer 100 and merchant 130 may act as senders and recipients in transactions and may interact with the blockchain 150 without necessarily acting as senders or recipients. Furthermore, one or both parties may act as, be provided with, or be in secure communication with storage entities that store a copy of the blockchain (e.g. having obtained a copy of the blockchain from a blockchain node 150). In some embodiments, this storage entity may be a headers client.

One or both of the customer 100 and the merchant 130 may operate as a light client. As such, the one or both of the parties 100-1, 130-1 may be connected as part of a different network, e.g. a network overlaid on top of the blockchain network 106. Users of the blockchain network (often referred to as "clients") may be said to be part of a system that includes the blockchain network; however, these users are not blockchain nodes 150 as they do not perform the roles required of the blockchain nodes. Instead, each party 100-1, 130-1 may interact with the blockchain network and thereby utilize the blockchain by connecting to (i.e. communicating with) a blockchain node 150. It will be understood that many more such customers 100-1 and their respective computer equipment 100 may be present and participating in the system 10, but for convenience they are not illustrated. Each party 100, 130 may be an individual or an organization.

Light clients generally do not possess a full replica of the blockchain and as such are much cheaper to run and require much lower bandwidths compared to a "full" or "miner" node. Light clients can rely on data provided to it by a headers client, for example concerning a best chain of block headers and/or a Merkle root value of a transaction. The best chain can be described as a chain of blocks from genesis, which is a first block in the blockchain, to a current best block, which is a latest block in the blockchain. The best block may have the highest cumulative proof-of-work, which can be described as the most energy expended by the network in maintaining that particular branch of the blockchain. Sourcing block headers for the headers client to determine the best chain of block headers could be performed through the merchant API 140 mentioned above. Light clients can therefore scale in line with their own data/transaction volumes, entirely unaffected by the volumes of data and transactions going into each block.

In accordance with embodiments disclosed herein, and as described for example in more detail in GB 2106950.5 filed on 14 May 2021 in the name of nChain Holdings Limited, headers clients can determine a best chain of block headers which can be easily accessible to light clients such as the customer 100 and merchant 130, and which can also be updated as the blockchain is extended. The best chain of block headers is useful to light client applications for transaction verification because it provides a view of the state of the blockchain without providing full transaction information for each block on the blockchain. Storage space of the storage module of a headers client may be reduced compared to a "full" node of the blockchain because block headers are not data heavy, particularly compared to a block on the blockchain itself. As such, the processing performed at the headers client can be fast compared to full nodes. In addition to lower storage space requirements, computing power required to operate the headers client may also be small compared to a full node and the headers client can be cheaper to run and maintain than a full node. For instance, a headers client may be run on a single board computing device, such as a Raspberry Pi.

A light client can use the information provided by a headers client to independently construct a Merkle root of a previous transaction which creates an unspent transaction output, UTxO. The computer equipment 100, 130 comprises respective processing apparatus comprising one or more processors, e.g. one or more CPUs, GPUs, other accelerator processors, application specific processors, and/or FPGAs. The computer equipment of each party further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 100, 130 of each party 100-1, 130-1 stores software comprising a respective instance of at least one client application arranged to run on the processing apparatus. It will be understood that any action attributed herein to a given party 100-1, 130-1 may be performed using the software run on the processing apparatus of the respective computer equipment 100, 130. The computer equipment 100, 130 of each party 100-1, 130-1 comprises at least one user terminal, e.g. a desktop or laptop computer, a tablet, a smartphone, or a wearable device such as a smartwatch. The computer equipment 100, 130 of a given party 100-1, 130-1 may also comprise one or more other networked resources, such as cloud computing resources accessed via the user terminal.

A client, or customer, application may be initially provided to the computer equipment 100, 130 of any given party 100-1, 130-1 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application may comprise a "wallet" function. This has two main functionalities. One of these is to enable the respective party 100 to create, authorise (for example sign) and send transactions and/or partial transactions or transaction templates to other entities in the system such as another client or one or more blockchain nodes 150 to then be propagated throughout the network of blockchain nodes 150 and thereby included in the blockchain. Typically, only completed transactions (and not partial transactions or transaction templates) are sent to the blockchain node 150 to be submitted to the blockchain. The other function of the wallet is to report back to the respective party the amount of the digital asset that he or she currently owns. In an output-based system, this second functionality comprises collating the amounts defined in the outputs of the various transactions scattered throughout the blockchain that belong to the party in question.

In some embodiments, the customer light client 100 may comprise one or more of the following units: a payment protocol client, a payment protocol server, an SPV Channel client, a transaction builder, a headers client, an SPV validator and a payment validator. The customer light client may interact with a customer wallet and a customer PayMail server, for example the PayMail server 110. As described in more detail at U.S. Ser. No. 16/384,696 filed on 15 Apr. 2019 in the name of nChain Holdings Limited, an alias based payment service can be implemented which comprises providing an alias for a given client, the alias being specific to the given client, the alias including or related to a network identifier. The method then includes associating the alias with the network identifier in a directory. This association is achieved by the steps of creating a service record based on the network identifier in the directory. The service record is then updated to indicate that the payment service is provided by a network or a domain associated with the network identifier and a location for a host computing resource responsible for the payment service, wherein the host computing resource is configured to facilitate identification of the client associated with the alias, responsive to receipt of a request pertaining to a transaction related to the alias. A PayMail Server referred to herein can be considered to be a server that implements the alias based payment service, for example as the directory. The Paymail Server 110 may store information, for example about a customer 100. It may be running on single, remote or distributed computing nodes or entities that can be accessed by one or more clients, such as a customer device 100 or a merchant device 130, over a wired or wireless communication network.

In some embodiments, the merchant light client may comprise one or more of the following units: a payment protocol client, a payment protocol server, an SPV Channel client, a transaction builder, a transaction broadcaster, a headers client, an SPV validator, a PayMail Client, and a payment validator. A merchant API, mAPI 140 may also be run on the merchant light client. The merchant light client may interact with a merchant wallet, the SPV Channel Server 120 and the PayMail server 110. Through mAPI 140, the merchant 130 can also interact with a miner node which is a blockchain node 150 capable of submitting transactions to the blockchain ledger.

The payment protocol clients at the merchant device 130 and the customer device 100 work in conjunction with the respective payment protocol servers, for example where the client triggers communications with the server, facilitating communication between the two entities. Similarly, the SPV client at the customer device 100 and merchant device 130 provides functionality such that the respective devices can communicate with the SPV channel server 120. The Pay- Mail clients provide communication between the customer device 100 and merchant device 130 and the PayMail server 110.

The transaction builder can build transactions, for example in conjunction with a wallet associated with the customer 100 or merchant 130. In some examples, the transaction builder inserts transaction inputs and/or outputs to a transaction template at the merchant and/or customer device. The inputs and outputs in some embodiments can comprise the public key of the wallet from which the transaction is spent from/paid to (i.e. the public key of the merchant or customer). In some embodiments, the transaction template may be populated with transaction inputs and outputs separately. In one example, the merchant device 130 provides a transaction template with transaction outputs to the customer device 100 and the customer device 100 completes the template transaction by providing the transaction inputs.

The transaction broadcaster communicates with payment protocol implemented by mAPI 140 to broadcast one or more transactions to a blockchain node 150 for submission to the blockchain ledger.

The payment validator, SPV validator and headers client may work in combination to verify or validate a transaction as described in more detail below.

Note: whilst the various client functionality may be described as being integrated into a given client application this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these.

The Channel Server 120 may be running on single, remote or distributed computing nodes or entities that can be accessed by one or more clients, such as a customer device 100 or a merchant device 130, over a wired or wireless communication network. In some embodiments the client may be an entity, user terminal/device or a computing device or system having one or more processors. In some embodiments, the client may be associated with a digital wallet of the customer 100 and/or merchant 130 that allows the client to manage one or more digital assets such as cryptocurrency and tokens etc. In some embodiments, the channel service may be provided to a given client among the one or more clients via a digital wallet. However, it is to be understood that client entities not having a digital wallet or a separate applications for digital assets are also within the scope of this disclosure. In some embodiments, especially for computationally sophisticated clients, the channel processor implementing the channel service can be integrated with or be part of the client entity, for example wherein the merchant 130 is the client entity. In this case, the channel processor may be implemented as a module within a client terminal that enables channel service functionality for said client. In some embodiments, other clients or entities may also be served by said channel processor.

The side channel 125, also referred to herein as a channel and/or a secure channel, enables exchange of data separately from the blockchain network. Such communication is sometimes referred to as "off-chain" communication. For instance, this may be used to exchange a transaction invoice between the customer 100 and the merchant 130 without the transaction (yet) being registered onto the blockchain network 155 or making its way onto the blockchain. Sharing a transaction, or an invoice transaction, in this way is sometimes referred to as sharing a "transaction template". A transaction template may lack one or more inputs and/or outputs that are required in order to form a complete transaction. Alternatively or additionally, the side channel 125 may be used to exchange any other transaction related data, such as keys, negotiated amounts or terms, data content, etc. In some embodiments the channel 125 is associated with one or more functions that include: channel functions or procedures pertaining to the for transmission of data; and/or message functions or procedures pertaining to the data being transmitted using the channels. Thus, the channel 125 enables direct or peer-to peer communication paths or sessions between entities for the transfer of messages or data in a secure environment. In most embodiments there are only two entities for each channel 125; the customer 100 and the merchant 130. In most embodiments, the channels enable full-duplex, i.e. two-way communication between the client and the other entity. In some embodiments, communication may only be allowed in one direction, i.e. the client might only want to send messages to or receive messages form the other entity.

An example of the channel service and/or channel processor is described in detail in UK patent application no. 2007597.4 filed on 21 May 2020 in the name of nChain Holdings Limited, the subject matter of which is herein incorporated by reference.

In some embodiments, the channel 125 may be associated with a channel identifier, the channel identifier associated with a location or an access point for the channel 125. In some embodiments, each channel 125 is associated with a specific channel identifier. The same given client can have a number of separate channels, each with its own unique identifier, which may correspond to a location or endpoint via which the channel 125 can be accessed. In some embodiments, a given channel 125 is for communication with any other entity in relation to data that is associated with a specific type or topic, where the data associated each topic in a channel 125 is or is included in one or more messages or transactions. Advantageously, having a specific channel 125 for a specific topic or transaction ensures greater clarity, reliability and flexibility for the client, especially in case of a client like a merchant entity, which may have a number of topics (such as a transaction number or ID or invoice number) that needs to be tracked or dealt with separately from all other topics or other transactions that are associated with the same client.

For client entities that are associated with a business or may represent an organisation, such as a merchant, such clients may have a large number of other entities (customers) conducting transactions with them regarding a number of goods. Therefore, for such scenarios, using channels for communication with one or more customers or transactions, while being disassociated or decoupled from implementing any functionality that is related to the blockchain that maintains a record of all such transactions will be hugely beneficial. With the provision of channel functions as well as message functions via a channel service, such clients have the ability to utilise a specific channel 125 for a specific customer relating, and in some embodiments to a specific transaction (such as a particular invoice or a query for certain goods etc) and are able to obtain any further information specific to such transaction via said channel 125 at any time.

In some embodiments, there may be a plurality of channels and the above-mentioned channel 125 is one of the plurality, these being the channels that are based on the one or more functions provided by the channel service. In some embodiments, the one or more functions are application programming interfaces (APIs) issued for or provided to the given client, said APIs including channel API's for the one or more channels; and message APIs for data, i.e. messages relating to a topic associated with each, or a given channel 125. APIs may be understood as endpoints, interfaces or a set of functions and procedures allowing the creation or management of applications for an entity, such as the client in this case, that access the features or data of an application, or other services. In this case, it is to implement the channel functions as well as message functions.

A payment processor, also called a merchantAPI or mAPI, 140 provides functionality to process the payment as described in detail in UK patent applications GB 1914043.3 filed on 30 Sep. 2019 and GB 2015358.1 filed on 29 Sep. 2020 in the name of nChain Holding Limited. The payment processor is communicatively coupled to the merchant 130 and/or the customer 100, and also coupled to a plurality of miner nodes 150 which may include more than one network of miners or more than one mining pool. In some embodiments, the payment processor 140 may be part of or implemented in association with the merchant 130, which may be a computationally sophisticated merchant point of sale (POS) terminal.

In some embodiments the payment processor/mAPI 140 is configured to provide a payment interface for the one or more clients (i.e. the customer 100 and merchant 130) as an associated or a third-party service. In some embodiments, the payment processor is implemented as an application programming interface (API) for providing a web-based interaction, i.e. implemented as a web services, for the one or more clients such that communication may take place over the Internet using standard Internet communication protocols for web based services, such as HTTPS, TCP/IP etc.

This API is either known or made available to or is sent/provided to the merchant 130 or customer 100 associated with the payment processor. In some embodiments, this API may be provided upon a registration or sign-up process to access the service or functions provided by the payment processor. In some examples, the API may be provided or published for use via API user interfaces such as Swagger, which is a well-known API design and development tool or interface for clients or other entities wishing to access a web-based service. Advantageously, the API of the present disclosure may be implemented as a REST (Representational State Transfer) endpoint, thereby allowing communication using standard Internet or web-based protocols, such as HTTPS. REST is an architectural style for developing web services and web-based interactions. REST API design standards can process HTTPS requests and communication using the following commands:

| Commands | GET | POST | PUT | DELETE |
|---|---|---|---|---|
| Resource | read | create | update | delete |

A resource in the context of REST API is an object with a type, associated data, relationships to other resources, and a set of methods that operate on it. In some embodiments, the payment service is provided by the payment processor as an API implementation to access the state of a blockchain or distributed ledger, such as the Bitcoin SV (BSV) blockchain, and to trigger operations that can alter that state, via an application interface, and expose it as a REST API. Thus, the payment processor may be considered as a REST endpoint for one or more clients. The merchant 130 can thus communicate with the payment service via HTTPS and furthermore have anonymous access to the payment processor, or the payment service implemented by the payment processor.

Due to the resources involved in transaction validation and publication, typically at least each of the blockchain nodes 150 takes the form of a server comprising one or more physical server units, or even whole a data centre. However, in principle any given blockchain node 150 could take the form of a user terminal or a group of user terminals networked together.

The memory of each blockchain node 150 stores software configured to run on the processing apparatus of the blockchain node 150 in order to perform its respective role or roles and handle transactions in accordance with the blockchain node protocol. It will be understood that any action attributed herein to a blockchain node 150 may be performed by the software run on the processing apparatus of the respective computer equipment. The node software may be implemented in one or more applications at the application layer, or a lower layer such as the operating system layer or a protocol layer, or any combination of these.

FIG. 2 illustrates a block diagram of a method for processing a transaction between a merchant 130 and a customer 100.

According to a first step 200 of the method comprises receiving, at a merchant device, customer information and establishing a secure communication channel between the merchant and the customer. Preferably, the customer and merchant devices are light client devices which do not run a full blockchain node, i.e. they do not possess a full replica of the blockchain. Customer information may for example include a request to purchase goods or services from the merchant and/or customer identification such as a customer alias. A secure communication channel can be set up between the two parties for exchanging information, such as transaction information, in a secure manner. Information that is securely exchanged prior to the transaction being submitted can prevent certain information being written to the blockchain, which may be a public ledger.

According to a second step 220 of the method comprises generating, at the merchant device, an invoice transaction. In some embodiments, this may be a payment request or a template transaction to be completed by the customer. The invoice transaction can be constructed based on the received customer information, for example to specify an amount to be paid to the merchant for the goods and/or services requested by the customer and may further comprise transaction outputs provided by the merchant. In some embodiments, the merchant may perform a check to ensure that the customer identification provided by the customer is valid. Transaction outputs may comprise a digital signature of the merchant and/or an amount of cryptocurrency to be paid to the merchant by the customer.

According to a third step 240 the method comprises authorising and validating the transaction at a customer device. This can be achieved by exchanging information between the merchant and customer via the secure communication channel. For example, the customer may provide transaction inputs to complete the payment transaction ready for being transmitted to the blockchain.

According to a fourth step 260, the method comprises submitting the valid transaction to a blockchain and verifying that the transaction has been included on the blockchain ledger. The merchant may independently validate the transaction prior to submitting it to the blockchain ledger. The transaction may be first transmitted to a node which is a full node of the blockchain network before being transmitted to the blockchain.

Figure 3A:
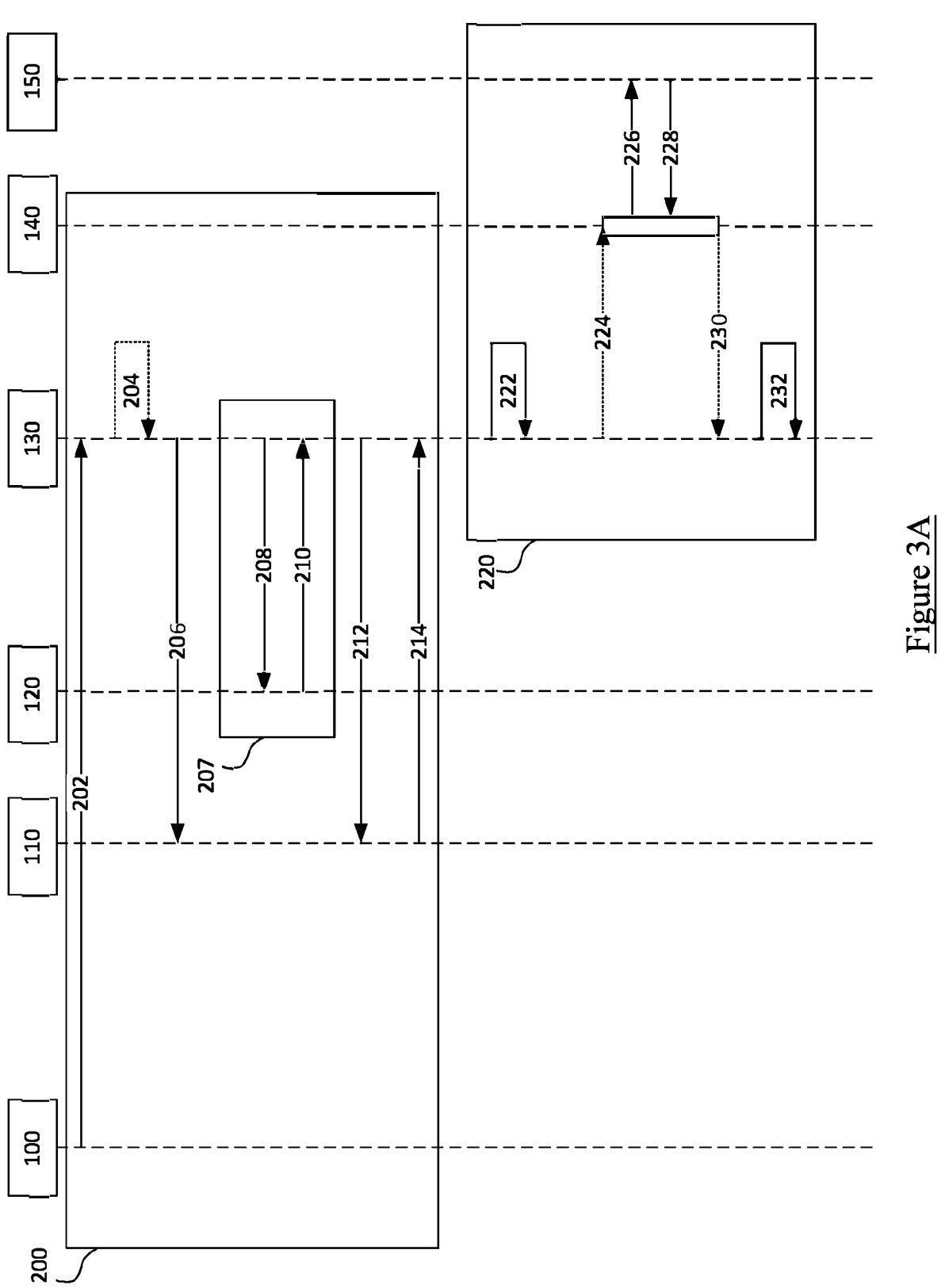
FIGS. 3A and 3B illustrate a peer-to-peer transfer protocol flow for processing a transaction between a customer and a merchant.
Figure 3B:
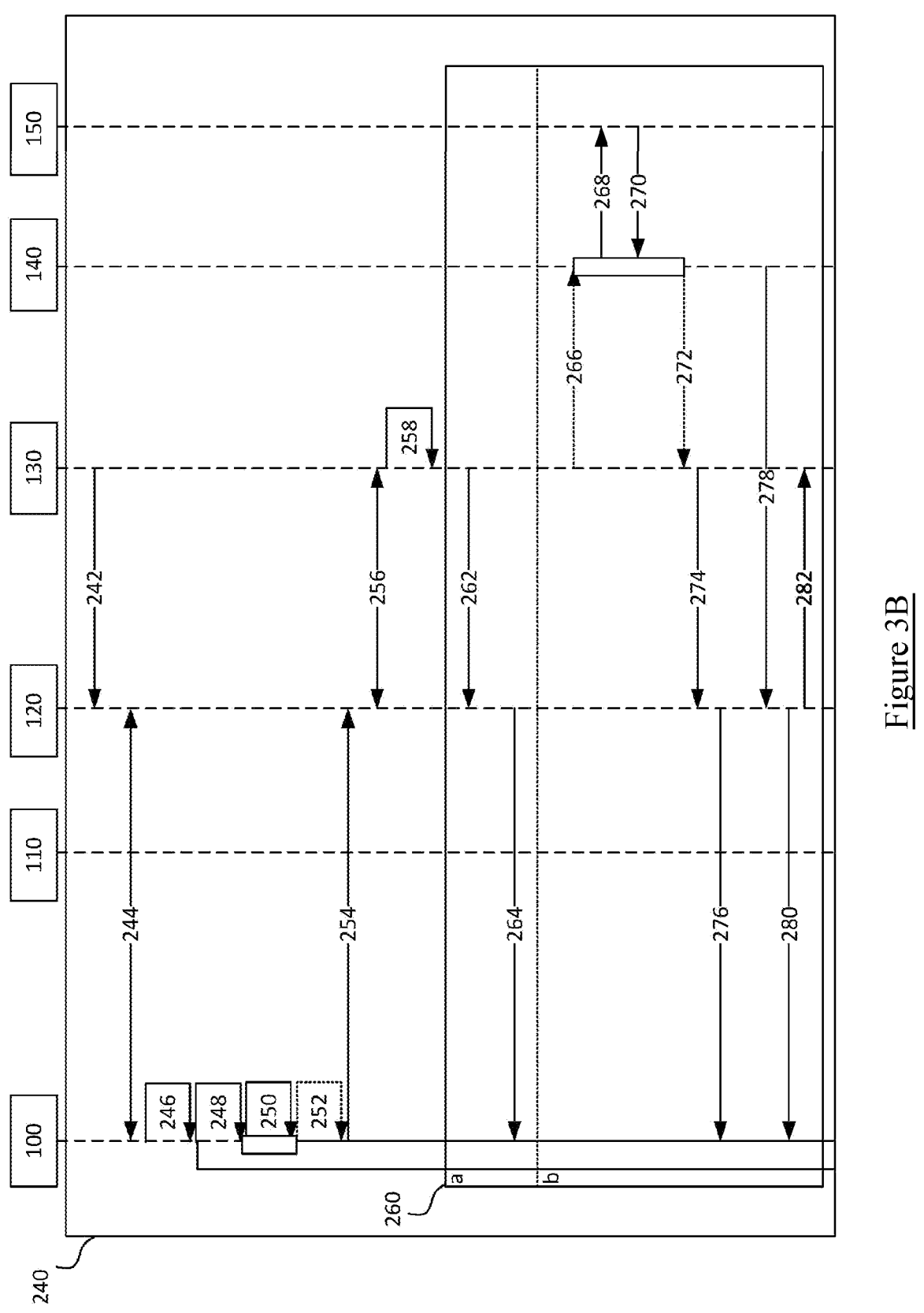

The steps of the above method are described in more detail below in relation to FIGS. 3A and 3B. FIGS. 3A and 3B illustrate a peer-to-peer (P2P) payment protocol flow for processing a transaction between a customer 100 and a merchant 130. The payment service is implemented as a gateway or an API endpoint to which one or more clients have access to. The one or more clients include a customer 100, a Paymail Server 110, an SPV Channel Server 120, a merchant 130, a merchantAPI (mAPI) 140 and a blockchain node 150. Communications between the entities are illustrated with arrows, whereby the arrow indicates that a communication is being made from one of the entities to another of the entities in the direction of the arrow.

The method may take place when a customer 100 wants to buy something from the merchant 140. A first process 200, establishes communication channels between the customer 100 and the merchant 130. The first process 200 can include the following steps 202 to 214.

At step 202, a purchase order is created by a customer 100, for example for goods or services offered by the merchant 130. The purchase order may comprise creating a basket of goods, such as an online basket, and may further include information about the customer 100 such as customer identification. In some embodiments, customer identification is provided by an alias of the customer. In some examples, the customer alias may comprise PayMail information wherein PayMail information may include an alias (for example a PayMail ID) of the customer 100. A communication, such as a message, is sent from customer 100 to the merchant 130 comprising said information. This communication may be sent over a communications network such as the internet 105.

At step 204, the customer information is received at the merchant 130 and the merchant identifies the customer 100. In some embodiments, a Host Discovery for Customer PayMail is performed at the merchant 130, which finds the customer based on the provided alias (PayMail ID). Customer identity, such as PayMail ID of the customer 100, may be recorded at the merchant 130, for example at a payment protocol server which is associated with the merchant device 130.

At step 206, standard public key infrastructure (PKI) techniques may be used and implemented if verification of customer ID is based on a digital signature. In some embodiments, a Perform PKI Validation and get Customer Identity message can be sent from the merchant 130 to the Paymail Server 110. In some embodiments, the merchant 130 may further request or send message to initiate sender validation and get sender public key (MVP) and identity information such as travel rules in future from the PayMail server 110. Information can be received at the merchant 130 in response to the requests made to the Paymail server 110 and may be stored for future usage.

A second process 207, may take place within the first process 200. The second process 207 comprises the merchant 130 creating a new channel, for example side channel 125 as illustrated and discussed in relation to FIG. 1. In some embodiments, the new channel 125 may be created for an existing merchant account with the channel server 120. The channel 125 is preferably a secure channel, such as a SPV Channel. SPV Channels are described in more detail at in UK patent application no. 2007597.4 filed on 21 May 2020 in the name of nChain Holdings Limited.

At step 208, which is part of the second process 207, the merchant 130 sends a request to the SPV Channel Server 120 for a new channel to be created by the SPV Channel Server 120. This message may be sent from an SPV Channel client associated with the payment protocol server of the merchant 130.

At step 210, which is also part of the second process, the SPV Channel Server 120 creates a new channel and provides a Channel ID to the merchant 130 in response to the create channel request sent to the SPV Channel Server 120 by the merchant 130. In some embodiments, the Channel ID can be provided to the customer 100 via the Paymail Server 110, whereby the merchant 130 provides the Channel ID to the Paymail Server 110. This allows the customer 100 to log into the channel once it has received the Channel ID provided to it. Any future communications between the merchant 130 and customer 100 may take place via this secure channel 125, which has a unique Channel ID. In some embodiments, the customer 100 and/or merchant 130 are notified when a new message is provided to the channel. Optionally, the customer 100 and merchant 130 can post messages and or information to each other through the channel such that the channel is multidirectional between the customer 100 and the merchant 130.

At step 212, which is part of the first process 200, channel and merchant details are transmitted from the merchant 130 to the Paymail Server 110. In some embodiments, the method includes validating the merchant 130 based on a timestamp and digital signature included in the request.

In some embodiments, the public addresses of the customer 100 and the merchant 130 each include a public key of a respective digital wallet associated with the customer 100 and the merchant 130, and wherein a digital signature is used for verifying the identity of the merchant 130 requesting the transaction. In some related embodiments, the digital signatures associated with both the merchant 130 and customer 100 are required for verification of each respective entity, for example before the transaction is created, stored or posted on the distributed ledger.

At step 214, responsive to successful validation, an output script associated with the customer 100 is provided to the merchant 130. This output script may be used for creating a transaction, the transaction to be stored on or posted to a distributed ledger (blockchain ledger). The Paymail Server 110 may send a message, for example a "Response OK" message, to the merchant 130 to confirm that the channel and merchant details have been accepted.

Once a communication has been established in the first process 200, a third process 220 can take place. In the third process 220, the merchant 130 creates an invoice and a payment request. The merchant 130 creates the invoice based on the purchase order of the customer 100 for the goods or services that the customer wishes to purchase. Customer information provided by the customer 100 is also used to create the invoice.

At step 222, the merchant 130 creates an invoice (for example a Payment Request). The invoice may specify an amount to be paid from the customer 130 to the merchant 130 for the items or such like in the customers basket of goods. In some embodiments, this may be a template transaction or a partial transaction.

Optionally, at steps 224 and 230, the merchant 130 communicates with the payment processor merchantAPI (mAPI) 140, and mAPI 140 communicates with blockchain node 150 at steps 226 and 228. The merchant 130 sends a GET policyQuote( ) message (if no un-expired quote available) to mAPI 140. The payment processor mAPI 140 communicates with the blockchain node 150 in response to receiving the message from the merchant 130. Since the payment service implemented by the payment processor is an API, in some embodiments a first request and/or the status query from the merchant 130 is a HTTPS GET request. Thus advantageously, standard Internet and web-based communication protocols can be used by the client to request for a transaction to be mined into a blockchain. In some embodiments, data associated with the first and/or second request, and/or the status query from the client, is provided in a JavaScript Object Notation (JSON) object format.

At step 226, a policyQuote Response is received at the merchant 130, sent by mAPI 140 as a result of the interaction between mAPI 140 and blockchain node 150.

At step 232, the merchant 130 constructs a payment request to be delivered to the customer 100. The payment request may be a partial invoice transaction or a transaction template. The payment request constructed by the merchant 130 may comprise outputs, Payment fees, etc. The payment protocol server may interact with a wallet associated with the merchant device 130. For example, the payment protocol server may receive transaction outputs (TxO) from the merchant wallet. In some embodiments, the payment request constructed by the merchant 130 does not comprise transaction inputs. The transaction inputs may be inserted to the transaction later, for example by a customer wallet of the customer 100.

A fourth process 240 executes P2P Payment Protocol steps such that the invoice is sent to the customer and paid by being submitted to the blockchain.

At step 242, the merchant 130 posts the invoice (prepared in the third process 220) to the SPV Channel Server 120 via the secure channel established in the first process 200. The invoice may comprise the Payment Request, for example comprising transaction outputs determined by the merchant 130. The arrival of the payment request in the secure channel 125 prompts the customer 100 to receive a notification for example notifying the customer that there is a new message in the secure channel to be seen.

At step 244, the customer 100 receives or views the payment invoice received from the merchant 130 via the secure channel 125 established by SPV Channel Server 120. The customer 100 optionally establishes a check that the request originates from the merchant 130 by implementing an addressing process/protocol or mechanism, such as a payment service associated with the merchant 130. In some embodiments, this includes sending the request from the merchant 130, the request based on an alias for the customer 100.

At step 246, the customer 100 reads the Payment Request. The customer 100 then proceeds to authorize the payment request.

At step 248, the customer 100 fetches Inputs and Merkle Proofs for the payment from a customer wallet. These can be added to the partial transaction (transaction template) sent to the customer 100 by the merchant 130 to complete the transaction.

At step 250, the customer 100 constructs a payment transaction and also constructs transaction information, which in some embodiments may include a data structure that further comprises Merkle Proofs and full transactions of confirmed ancestors such as an SPV envelope 300.

Figure 3C:
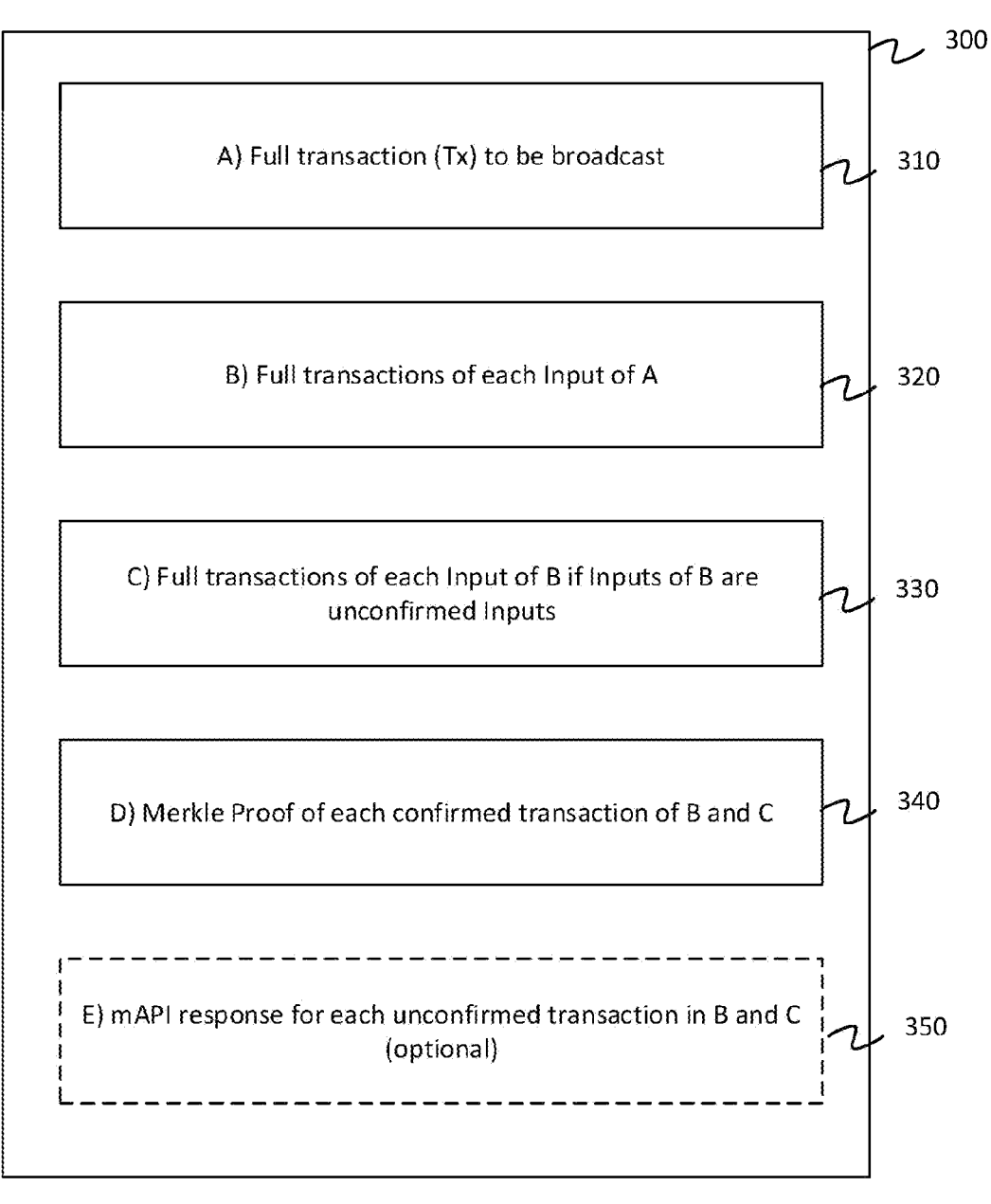
FIG. 3C illustrates a schematic of an SPV Envelope data structure.

FIG. 3C illustrates an example schematic of a data structure that encapsulates a transaction, also called an SPV envelope 300. Data that might be contained in an SPV envelope 300 includes one or more of the following:

A) the transaction (Tx) to be broadcasted 310,
B) the full transactions of confirmed Inputs of the transaction in A 320,
C) the full transactions of unconfirmed Inputs of the transaction in A 330. This can be traced back to, and may include, the first confirmed transaction ancestor,
D) the Merkle Proof of each confirmed transaction in B and/or C 340, and/or
E) the mAPI response for each unconfirmed transaction in B and/or C (optional) 350.

The SPV Envelope 300 is a data structure that encapsulates a transaction along with Merkle Proofs 340 and full transactions of confirmed ancestors 320. This structure could further include intermediate unconfirmed ancestors to make an unbroken chain back to a confirmed transaction 330. Optionally, unconfirmed transactions can be accompanied by mAPI responses 350 signed by miners to demonstrate that the transaction has been broadcast and accepted for block inclusion.

In some embodiments this may be performed by fetching inputs via customer wallets APIs. The SPV envelope 300, along with encapsulated Merkle proof(s) 340 provide information that help to prove that a transaction is valid. SPV Envelopes 300 establish a standardised method of communicating the supplementary information required for independent transaction checks to be performed. As there is likely to be a wide variety of wallet implementations transmitting and receiving SPV information for various reasons, it simplifies implementations if a standard format is adopted.

In many cases, broadcasters of transactions to miners do not have the information required to perform an independent check of transaction validity, namely, pass/fail assessment, correct miner fee and signature integrity. Additionally, SPV envelope 300 enables a higher level of confidence in transactions with unconfirmed ancestors, such as reduced double spend risk, and transactions with interim state, such as state channels by providing information required to validate transactions.

The inclusion of a combination of Merkle Proofs 340 and signed mAPI responses 350 provides all the information required to assess the likelihood of the transaction being confirmed. The recipient can optionally register for double spend notifications on all unconfirmed ancestors via mAPI 140 if the mAPI responses are deemed inadequate. Raw transaction bytes can be used as the transaction IDs need to be calculated as part of the proof process.

Transactions may be parsed in order to determine input references as well as output values to calculate fees. It is generally assumed that an SPV envelope 300 will contain a proof for only one transaction. However, the data structure accommodates the case where more than one transaction is included.

At step 252, the customer 100 authorises and approves the invoice (payment request) and signs it, for example with a signature of the customer. In one embodiment, the customer 100 can click a button, for example an "OK" button to sign the Inputs and validate the invoice. In other embodiments, the customer may be asked for a password or passcode which acts as a signature.

At step 254, the Payment is posted (with SPV envelope 300) from customer 100 to SPV Channel Server 120.

At step 256, the SPV Channel Server 120 and merchant 130 communicate to retrieve the completed Payment with SPV Envelope. In some embodiments, the Payment and SPV envelope may be received at the payment protocol server of the merchant 130.

At step 258, the merchant 130 independently validates the Payment transaction (Tx). In some embodiments, this may comprise the payment protocol server of the merchant device communicating with a payment validator of the merchant device. The payment validator may interact with a headers client, for example to validate the payment transaction by performing an SPV check, for example with an SPV validator. The SPV validator communicates with the headers client to validate that the Block Hash of the payment transaction is in the best chain of block headers. If it is confirmed that the Block Hash is in the best chain, the transaction can be confirmed as a valid transaction.

In accordance with embodiments disclosed herein, and as described for example in more detail in UK application no. GB 2102217.3 filed on 17 Feb. 2021 in the name of nChain Holdings Limited, the merchant 130 comprises a function for querying a headers client in relation to the best chain of block headers. The merchant 130, which has constructed the transaction, can validate them before submitting them for inclusion in the blockchain. They can also learn about the state of their transactions (or transactions from other clients) from external sources. The merchant 130 may become convinced that a transaction is valid if they are in possession of the following data:

The transaction whose inclusion is to be proved.

A Merkle inclusion proof of that transaction, which shows that a transaction contributed towards a Merkle root value.

A Bitcoin SV block header, which includes a Merkle root.

The best chain of block headers, as measured by proof-of-work.

Verification of a transaction inclusion can be performed as follows. First, the merchant 130 requests or views a block header stored at the headers client that relates to a particular transaction, for example a light client may view the best chain. The light client calculates the Merkle tree's root from the source transaction and inclusion proof. Faking a proof is as difficult as reversing a cryptographically strong hash function; that is, it is considered effectively impossible. The light client verifies that the Merkle root calculated in the previous step matches the Merkle root declared in the specified block header. The light client also uses the best chain of block headers to verify that the specified block header is present in the best chain. If all of these checks pass, then the transaction is ready to be included in the blockchain and the light client determines that the transaction is verified.

A Merkle proof may include the following data:

a transaction identifier (TxID) of a blockchain transaction that the Merkle proof relates to;

a block header of the block in which the blockchain transaction is included; and an array of sibling hashes for the transaction identifier (TxID).

Once the merchant 130 has validated the payment transaction, two alternative processes can occur. The first, where a transaction is an invalid transaction (Invalid Tx), or the second, where the transaction is a valid transaction (Valid Tx).

If the transaction is an Invalid Tx, at step 262, the merchant 130 rejects the payment. The merchant 130 sends a message to the SPV Channel Server 120 concerning this rejection (error).

At step 264, the SPV Channel Server 120 sends the reject payment (error) message on to the customer 100 through the secure channel 125.

If, however, the transaction is a Valid Tx, at step 266, the merchant 130 submits the transaction for posting to the blockchain. The Payment validator may communicate with a transaction broadcaster associated with the merchant device 130, which in turn communicates with mAPI 140. The transaction broadcaster of the merchant device 130 sends a POST submitTransaction(Tx) to mAPI 140. mAPI 140 posts the transaction to a blockchain node 150 which is a miner node at step 268 and a response is received from the miner node at step 270. Since the payment service implemented by the payment processor is an API, in some embodiments a second request is a HTTPS POST request.

At step 272, mAPI 140 returns a call-back notification to the merchant 130, indicating that the transaction has been written to the blockchain. In some embodiments, this may be a transaction posting response that is sent from mAPI 140 to the payment protocol server of the merchant device 130.

In one embodiment, a call-back notification relates to a proof of inclusion of the transaction submitted by the given client in the blockchain, i.e. a Merkle Proof. In this case the data provided in the channel 125 by the miner is a return Merkle proof, said return Merkle proof provided by the miner.

In some embodiments, a call-back notification generated by mAPI 140 may be an alert or message that is obtained as soon as data is exchanged between mAPI 140 and a miner node 150 of the blockchain network 155. It may be referred to as a call-back notification as it pertains to a specific TxID or blockchain transaction that has already been processed by the payment processor, i.e. already sent to a miner by the payment processor.

In other embodiments, a call-back notification relates to a notification of a double-spend of the transaction that has already been submitted by the customer 100 and recorded in the blockchain. In this case the data provided by the miner is a return payload including the following data:

the transaction identifier (TxID) of the blockchain transaction that is a double-spend; and, in some cases optionally a service endpoint for the payment processor that submitted the blockchain transaction. This is useful in case the client is associated with a plurality of payment services, and thus the identifier clearly indicates the payment processor that submitted the request to the miner in the first place.

At step 274, an acknowledgement, or "Payment ACK" message is sent from merchant 130 to the secure channel 125 at the SPV Channel Server 120.

At step 276, a "Payment ACK" message is sent from the secure channel 125 at the SPV Channel Server 120 to customer 100. In other embodiments, the customer 100 may view the message in the secure channel 125.

In some embodiments, the payment protocol server of the merchant device 130 may send a query to mAPI 140 concerning the current status of the transaction. mAPI 140 in reply sends an updated transaction status to the payment protocol server of the merchant device 130 in response to the query.

At step 278, the Merkle Proof is sent from mAPI 140 to the secure channel at the SPV Channel Server 120. Via the secure channel 125, the Merkle Proof can be distributed to the customer 100 and the merchant 130.

At step 280, the Merkle Proof received at the secure channel 125 at the SPV Channel Server 120 is sent from the SPV Channel Server 120 to the customer 100. The Merkle Proof can be stored at a customer wallet.

At step 282, the Merkle Proof received at the secure channel 125 at the SPV Channel Server 120 is sent from the SPV Channel Server 120 to the merchant 130. In some embodiments, the Merkle Proof is received at the SPV Channel client at the merchant device 130. The SPV channel client at the merchant device 130 may then forward the Merkle proof to the payment protocol server at the merchant device 130. The Merkle proof can be stored at the merchant wallet.

Optionally, once the transaction has been completed and the Merkle proof(s) have been provided, thereby validating the transaction, the secure channel may be closed.

Figure 4:
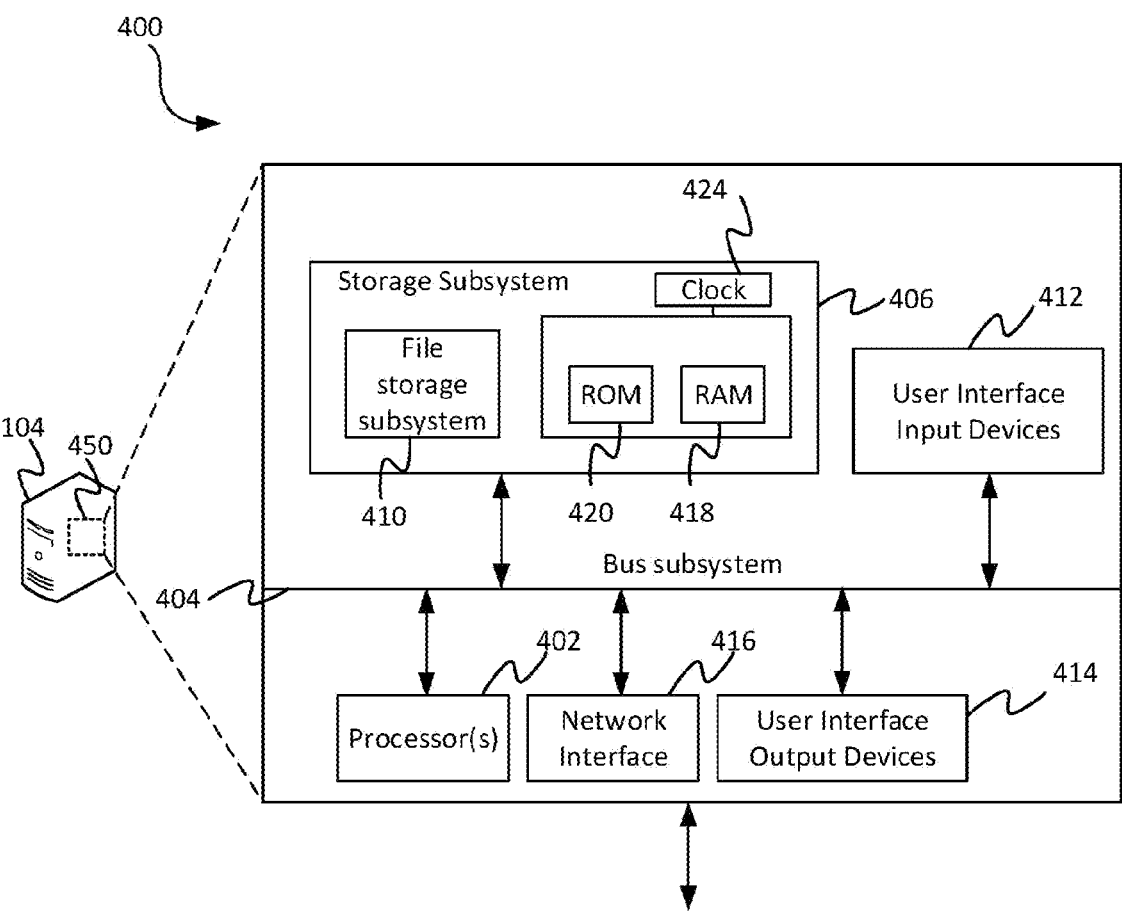
FIG. 4 provides an illustrative, simplified block diagram of a computing device that may be used to practice at least one embodiment of the present disclosure.

FIG. 4 provides an illustrative, simplified block diagram of a computing device 400 that may be used to practice at least one embodiment of the present disclosure. In various embodiments, the computing device 400 may be used to implement any of the systems illustrated and described above. For example, the computing device 400 may be configured to be used as a merchant device 130. Thus, computing device 400 may be a portable computing device, a personal computer, or any electronic computing device. As shown in FIG. 4, the computing device 400 may include one or more processors with one or more levels of cache memory and a memory controller (collectively labelled 402) that can be configured to communicate with a storage subsystem 406 that includes main memory 408 and persistent storage 410. The main memory 408 can include dynamic random-access memory (DRAM) 418 and read-only memory (ROM) 420 as shown. The storage subsystem 406 and the cache memory 402 and may be used for storage of information, such as details associated with transactions and blocks as described in the present disclosure. The processor(s) 402 may be utilized to provide the steps or functionality of any embodiment as described in the present disclosure.

The processor(s) 402 can also communicate with one or more user interface input devices 412, one or more user interface output devices 414, and a network interface subsystem 416.

A bus subsystem 404 may provide a mechanism for enabling the various components and subsystems of computing device 400 to communicate with each other as intended. Although the bus subsystem 404 is shown schematically as a single bus, alternative embodiments of the bus subsystem may utilise multiple buses.

The network interface subsystem 416 may provide an interface to other computing devices and networks. The network interface subsystem 416 may serve as an interface for receiving data from, and transmitting data to, other systems from the computing device 400. For example, the network interface subsystem 416 may enable a data technician to connect the device to a network such that the data technician may be able to transmit data to the device and receive data from the device while in a remote location, such as a data centre.

The user interface input devices 412 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 400.

The one or more user interface output devices 414 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 400. The one or more user interface output devices 414 may be used, for example, to present user interfaces to facilitate user interaction with applications performing processes described and variations therein, when such interaction may be appropriate.

The storage subsystem 406 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 406. These application modules or instructions may be executed by the one or more processors 402. The storage subsystem 406 may additionally provide a repository for storing data used in accordance with the present disclosure. For example, the main memory 408 and cache memory 402 can provide volatile storage for program and data. The persistent storage 410 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 400 may be of various types, including a portable computer device, tablet computer, a workstation, or any other device described below. Additionally, the computing device 400 may include another device that may be connected to the computing device 400 through one or more ports (e.g., USB, a headphone jack, Lightning connector, etc.). The device that may be connected to the computing device 400 may include a plurality of ports configured to accept fibre-optic connectors. Accordingly, this device may be configured to convert optical signals to electrical signals that may be transmitted through the port connecting the device to the computing device 400 for processing. Due to the ever-changing nature of computers and networks, the description of the computing device 400 depicted in FIG. 4 is intended only as a specific example for purposes of illustrating the preferred embodiment of the device. Many other configurations having more or fewer components than the system depicted in FIG. 4 are possible.

The invention claimed is:

1. A computer implemented method performed at a merchant device for processing a transaction between a customer and a merchant, the method comprising:

receiving a transaction request including customer information and a customer public key from a customer device associated with the customer, the customer public key being associated with an electronic wallet of the customer;

verifying an identity of the customer using the customer public key;

transmitting, to a Simplified Payment Verification server, a request to establish a secure communication channel between the customer and the merchant based on the customer information;

receiving, from the Simplified Payment Verification server, a channel ID associated with the secure communication channel, wherein the Simplified Payment Verification server also transmits the channel ID to the customer device;

generating a partial invoice transaction that is based on the customer information and includes at least one transaction output of an electronic wallet of the merchant;

sending the partial invoice transaction to the customer device via the secure communication channel;

receiving via the secure communication channel, a completed invoice transaction that is a completed version of the partial invoice transaction that includes at least one input transaction inserted by the customer device and including a Merkle proof determined from the electronic wallet of the customer and which has been authorised at the customer device;

validating, by the merchant device, the transaction defined by the completed invoice transaction by determining a first Merkle root determined by the merchant device matches a second Merkle root determined from the Merkle proof of the at least one output transaction of the completed invoice transaction to create a validated transaction;

broadcasting the validated transaction to a blockchain node to be submitted to a blockchain; and receiving at least one notification that the validated transaction has been validated by the blockchain node and included on the blockchain to execute the completed invoice transaction.

2. The method of claim 1, wherein the customer information comprises a purchase order and an alias of the customer.

3. The method of claim 2, wherein the alias of the customer is verified in connection with a server which is external to the merchant device.

4. The method of claim 1, wherein receiving the customer information establishes a handshake procedure between the customer and the merchant.

5. The method of claim 1, wherein the secure communication channel is established in connection with a channel server which is external to the merchant device.

6. The method of claim 1, wherein the secure communication channel permits communications to be sent from both the merchant to the customer and from the customer to the merchant.

7. The method of claim 1, wherein the secure communication channel is end-to-end encrypted.

8. The method of any claim 1, wherein generating the partial invoice transaction comprises populating a transaction template with one or more transaction outputs in connection with a merchant wallet.

9. The method of any claim 1, wherein the transaction comprises one or more transaction inputs associated with a customer wallet, wherein the one or more transaction inputs comprises at least a Merkle root of a previous transaction.

10. The method of claim 9, wherein the transaction is encapsulated in a data structure that further comprises Merkle Proofs and full transactions of confirmed ancestors.

11. The method of claim 9, wherein validating the transaction comprises independently constructing a Merkle root of the previous transaction and cross-checking the constructed Merkle root with the Merkle root of the one or more transaction inputs.

12. The method of claim 11, wherein the Merkle root is independently constructed by the merchant device in communication with a headers client which provides a best chain of block headers.

13. The method of claim 11, wherein the transaction is validated if the Merkle root provided in the transaction matches the independently constructed Merkle root.

14. The method of claim 1, wherein the transaction is a Bitcoin transaction.

15. The method of claim 1, wherein the at least one notification is a call-back notification.

16. The method of claim 15, wherein the call-back notification provides a return Merkle proof indicative that the transaction has been successfully submitted to the blockchain.

17. The method of claim 16, wherein the return Merkle proof comprises:

a transaction identifier of the blockchain transaction that the Merkle proof relates to;

a block header of the block in which the blockchain is included; and an array of sibling hashes for the transaction identifier.

18. The method of claim 1, further comprising sending the at least one notification to the customer device.

19. The method of claim 1, further comprising the step of closing the secure communication channel once the at least one notification has been received.

20. The method of claim 1, wherein a public address of the customer and a public address of the merchant each include a public key of a respective digital wallet associated with the customer and the merchant.

21. The method of claim 20, wherein a digital signature is used for verifying an identity of the merchant and/or the customer, and wherein the digital signatures associated with both the merchant and the customer are required for verification of each respective entity before the transaction is created, stored or posted on a blockchain ledger.

22. A computer system for processing a transaction between a customer and a merchant, the system comprising:

a merchant device configured to perform the steps of:

receiving a transaction request including customer information and a customer public key from a customer device associated with the customer, the customer public key being associated with an electronic wallet of the customer, verifying an identity of the customer using the customer public key, transmitting, to a Simplified Payment Verification server, a request to establish a secure communication channel between the customer and the merchant based on the customer information, receiving, from the Simplified Payment Verification server, a channel ID associated with the secure communication channel, wherein the Simplified Payment Verification server also transmits the channel ID to the customer device, generating a partial invoice transaction that is based on the customer information and includes at least one transaction output of an electronic wallet of the merchant, sending the partial invoice transaction to the customer device via the secure communication channel, receiving via the secure communication channel, a completed invoice transaction that is a completed version of the partial invoice transaction that includes at least one input transaction inserted by the customer device and including a Merkle proof determined from the electronic wallet of the customer and which has been authorised at the customer device, validating, by the merchant device, the transaction defined by the completed invoice transaction by determining a first Merkle root determined by the merchant device matches a second Merkle root determined from the Merkle proof of the at least one output transaction of the completed invoice transaction to create a validated transaction, broadcasting the validated transaction to a blockchain node to be submitted to a blockchain, and receiving at least one notification that the validated transaction has been validated by the blockchain node and included on the blockchain to execute the completed invoice transaction;

the customer device; and a blockchain node which is one of a plurality of blockchain nodes that make up a blockchain network.

23. A computing device comprising a processor and memory, the memory including executable instructions that, as a result of execution by the processor, cause the device to perform a computer-implemented method processing a transaction between a customer and a merchant, comprising:

receiving a transaction request by a merchant device, the transaction request including customer information and a customer public key from a customer device associated with the customer, the customer public key being associated with an electronic wallet of the customer;

verifying an identity of the customer using the customer public key;

transmitting, to a Simplified Payment Verification server, a request to establish a secure communication channel between the customer and the merchant based on the customer information;

receiving, from the Simplified Payment Verification server, a channel ID associated with the secure communication channel, wherein the Simplified Payment Verification server also transmits the channel ID to the customer device;

generating a partial invoice transaction that is based on the customer information and includes at least one transaction output of an electronic wallet of the merchant;

sending the partial invoice transaction to the customer device via the secure communication channel;

receiving via the secure communication channel, a completed invoice transaction that is a completed version of the partial invoice transaction that includes at least one input transaction inserted by the customer device and including a Merkle proof determined from the electronic wallet of the customer and which has been authorised at the customer device;

validating, by the merchant device, the transaction defined by the completed invoice transaction by determining a first Merkle root determined by the merchant device matches a second Merkle root determined from the Merkle proof of the at least one output transaction of the completed invoice transaction to create a validated transaction;

broadcasting the validated transaction to a blockchain node to be submitted to a blockchain; and receiving at least one notification that the validated transaction has been validated by the blockchain node and included on the blockchain to execute the completed invoice transaction.

24. A non-transitory computer-readable storage medium media having stored thereon executable instructions that, as a result of being executed by a processor of a computer, cause the computer to perform a method of:

receiving a transaction request by a merchant device, the transaction request including customer information and a customer public key from a customer device associated with a customer, the customer public key being associated with an electronic wallet of the customer;

verifying an identity of the customer using the customer public key;

transmitting, to a Simplified Payment Verification server, a request to establish a secure communication channel between the customer and a merchant based on the customer information;

receiving, from the Simplified Payment Verification server, a channel ID associated with the secure communication channel, wherein the Simplified Payment Verification server also transmits the channel ID to the customer device;

generating a partial invoice transaction that is based on the customer information and includes at least one transaction output of an electronic wallet of the merchant;

sending the partial invoice transaction to the customer device via the secure communication channel;

receiving via the secure communication channel, a completed invoice transaction that is a completed version of the partial invoice transaction that includes at least one input transaction inserted by the customer device and including a Merkle proof determined from the electronic wallet of the customer and which has been authorised at the customer device;

validating, by the merchant device, the transaction defined by the completed invoice transaction by determining a first Merkle root determined by the merchant device matches a second Merkle root determined from the Merkle proof of the at least one output transaction of the completed invoice transaction to create a validated transaction;

broadcasting the validated transaction to a blockchain node to be submitted to a blockchain; and receiving at least one notification that the validated transaction has been validated by the blockchain node and included on the blockchain to execute the completed invoice transaction.

* * * * *